(12) United States Patent
Ragavan et al.

(10) Patent No.: US 10,725,651 B2
(45) Date of Patent: Jul. 28, 2020

(54) GESTURE-BASED BRAILLE-TO-TEXT CONVERSION SYSTEM

(71) Applicant: ProKarma, Inc., Beaverton, OR (US)

(72) Inventors: RanjithKumar Ragavan, Beaverton, OR (US); Mohamed Ameer Irshad Hashim, Beaverton, OR (US); Raghul Ragavan, Beaverton, OR (US)

( * ) Notice: Subject to any disclaimer, the term of this patent is extended or adjusted under 35 U.S.C. 154(b) by 211 days.

(21) Appl. No.: 15/180,746

(22) Filed: Jun. 13, 2016

(65) Prior Publication Data

US 2016/0364136 A1 Dec. 15, 2016

Related U.S. Application Data

(60) Provisional application No. 62/174,038, filed on Jun. 11, 2015.

(51) Int. Cl.
| | |
|---|---|
| *G09B 21/02* | (2006.01) |
| *G06F 3/0488* | (2013.01) |
| *G09B 21/00* | (2006.01) |
| *G06F 3/023* | (2006.01) |
| *G06F 40/166* | (2020.01) |
| *G06F 3/16* | (2006.01) |

(52) U.S. Cl.
CPC ........ *G06F 3/04883* (2013.01); *G06F 3/0233* (2013.01); *G06F 40/166* (2020.01); *G09B 21/007* (2013.01); *G09B 21/02* (2013.01); *G06F 3/167* (2013.01)

(58) Field of Classification Search
CPC ... G09B 21/02; G09B 21/007; G06F 3/04883; G06F 40/166; G06F 3/0233; G06F 3/167
USPC .................................................. 434/112, 113
See application file for complete search history.

(56) References Cited

U.S. PATENT DOCUMENTS

| | | | |
|---|---|---|---|
| 8,766,786 B2 | 7/2014 | Radivojevic | |
| 2004/0161132 A1 | 8/2004 | Cohen et al. | |
| 2006/0014123 A1 | 1/2006 | Hanley | |
| 2010/0182242 A1* | 7/2010 | Fields | G06F 3/016 345/169 |
| 2011/0020771 A1* | 1/2011 | Rea | G09B 21/02 434/114 |
| 2011/0143321 A1* | 6/2011 | Tran | G09B 21/007 434/114 |

(Continued)

FOREIGN PATENT DOCUMENTS

| | | |
|---|---|---|
| CN | 102184662 A | 9/2011 |
| WO | 2012134210 A2 | 10/2012 |

*Primary Examiner* — Robert P Bullington
(74) *Attorney, Agent, or Firm* — Cramer Patent & Design, PLLC; Aaron R. Cramer

(57) ABSTRACT

A Braille user interface for a Braille communication system on a touch screen-enabled electronic device with a touch screen and a touch screen-enabled interface. A user inputs a six-bit Braille character composed of raised dots and non-raised dots. Raised dot are created by a swipe in a first direction (say right) while non-raised dots may be created by a swipe in a second direction (say left). Swiping may be performed on an input area of the touch screen which is smaller than the touch screen. The user is offered an opportunity to perform a character check of entered Braille characters. A character check may include playing back the entered character and then offering the user the option of correcting that entered character.

2 Claims, 4 Drawing Sheets

(56) References Cited

U.S. PATENT DOCUMENTS

| | | | |
|---|---|---|---|
| 2012/0007809 A1* | 1/2012 | Mahalingam | G09B 21/003 345/173 |
| 2012/0315606 A1* | 12/2012 | Jwa | G09B 21/02 434/114 |
| 2012/0315607 A1* | 12/2012 | Shin | G06F 3/0488 434/114 |
| 2014/0132401 A1 | 5/2014 | Lo | |
| 2015/0302774 A1* | 10/2015 | Dagar | G06F 3/04886 345/173 |
| 2016/0232817 A1* | 8/2016 | Djugash | G09B 21/02 |
| 2017/0169730 A1* | 6/2017 | Choi | G06F 3/0416 |

* cited by examiner

GESTURE-BASED BRAILLE-TO-TEXT CONVERSION SYSTEM

RELATED APPLICATIONS

This application claims the benefit of U.S. Provisional Application No. 62/174,038, which was filed Jun. 11, 2015, the entire disclosures of which are incorporated herein by reference.

FIELD OF THE INVENTION

The present invention relates generally to inputting Braille text using a computing device. More specifically it relates to generating Braille text using gesture inputs on a touch screen-enabled computing device.

BACKGROUND OF THE INVENTION

Among the many challenges faced by the visually impaired is communicating with others by writing. One (1) successful way for the visually impaired to communicate by writing is by using the Braille writing system. The Braille writing system is so widely used in the visually impaired community that it can be considered the gold standard in written communication with the visually impaired.

The Braille writing system uses a three-by-two (3×2) array of dot-based elements to depict letters, numbers and symbols. One skilled in the Braille writing system can effectively read information written in Braille. While the Braille writing system has proven itself to be highly useful, the modern computer driven world has highlighted some of its limitations. One (1) major issue is the speed at which computers can gather and disseminate information. To make effective use of computers some method of rapid text entry by the visually impaired is needed.

Recent advances in computer systems such as touch screen enabled smartphones, tablet computing platforms, e-book readers, vending machines and ATM's have enabled visually challenged people to make use of voice-to-text (read-aloud), text-to-speech and haptic feedbacks. While such advances have been highly beneficial to the visually impaired, in practice they require a steep learning curve that must be surmounted by a visually impaired person to make efficient use of every device they encounter.

In addition, the simple and most effective way to communicate in many occasions remains written. For example, text can be used to write emails, to interface and to interact with a computer system, and to generate letters and other documents. The visually impaired still have problems generating text, particularly on non-keyboard-based systems such as touch-screen enabled devices. In addition, data entry correction is a major problem for the visually impaired.

Accordingly, there exists a need for a standard Braille user interface system for use with touch screen-enabled devices. In practice that user interface should enable a Braille user to not only write text for emails, letters and other documents but also to interface with computer-based systems. Preferably such a user interface would enable a visually impaired person to make corrections to entered text. Ideally such a user interface would enable a visually impaired person to make corrections at the character, word, sentence, and paragraph levels.

SUMMARY OF THE INVENTION

The principles of the present invention provide for a standard Braille user interface system for use with touch screen-enabled devices. By using the inventive standard Braille user interface a user can not only write text for emails, letters and other documents but can also interface with computer-based systems. The inventive standard Braille user interface further enables a visually impaired person to correct entered text at the character, word, sentence, and paragraph levels.

The Braille user interface can be a Braille communication system having a touch screen-enabled electronic device with a touch screen and a touch screen-enabled interface for inputting a six-bit Braille character composed of raised dots and non-raised dots. Raised dot may be created by a swipe in a first direction while non-raised dots may be created by a swipe in a second direction. In practice the first direction can be to the right while the second direction can be to the left. Beneficially swiping may be performed on an input area of the touch screen which is smaller than the touch screen.

The Braille user interface may also take the form of a method of entering Braille text into an electronic device including the steps of locating a touch-screen enhanced computing system with Braille-to-text software and running that Braille-to-text software. Then, entering a six-bit Braille character comprised of raised dots and non-raised dots followed by offering the user an opportunity to perform a character check of the entered six-bit Braille character. Performing a character check may include playing back the entered character and then offering the user the option of correcting that entered character. If the user opts to correct the entered character, the method then enables the user to re-enter the character. The method may also include providing the user with an option to enter another character. If the user opts to enter another character, the method then enables the user to enter another a six-bit Braille character.

The method preferably provides the user with an option to readout the entered Braille characters and the option to correct one (1) or more entered Braille characters. In any event the method preferably allows entering Braille characters by creating at least one (1) raised dot by swiping across the touch-screen in a first direction. Further, the method allows entering the Braille character by creating a non-raised dot by swiping across the touch-screen in a second direction.

The Braille user interface may also take the form of a communication system which is configured for use with a touch screen-enabled interface of a computing system which is stored in non-transient software for conversion between Braille text and another written language based upon receipt of input. Such input includes a first gesture corresponding to a first element of Braille which is read by the interface and a second gesture corresponding to a second element of Braille which is also read by the interface. The first gesture and the second gesture are used to input a Braille character while the computing system converts that Braille character into the other written language.

In practice the other written language is English, the first gesture is a swipe is the right direction which creates a raised dot, and the second gesture is a swipe in the left direction which creates a non-raised dot. A third gesture which activates an audible validation step may be included. Beneficially the third gesture is a double tap.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2b is a figurative depiction of the motion required to produce a non-raised dot on a specific element using the touch screen-enabled electronic device 45 shown in FIG. 2a;

DESCRIPTIVE KEY

Figure 1:
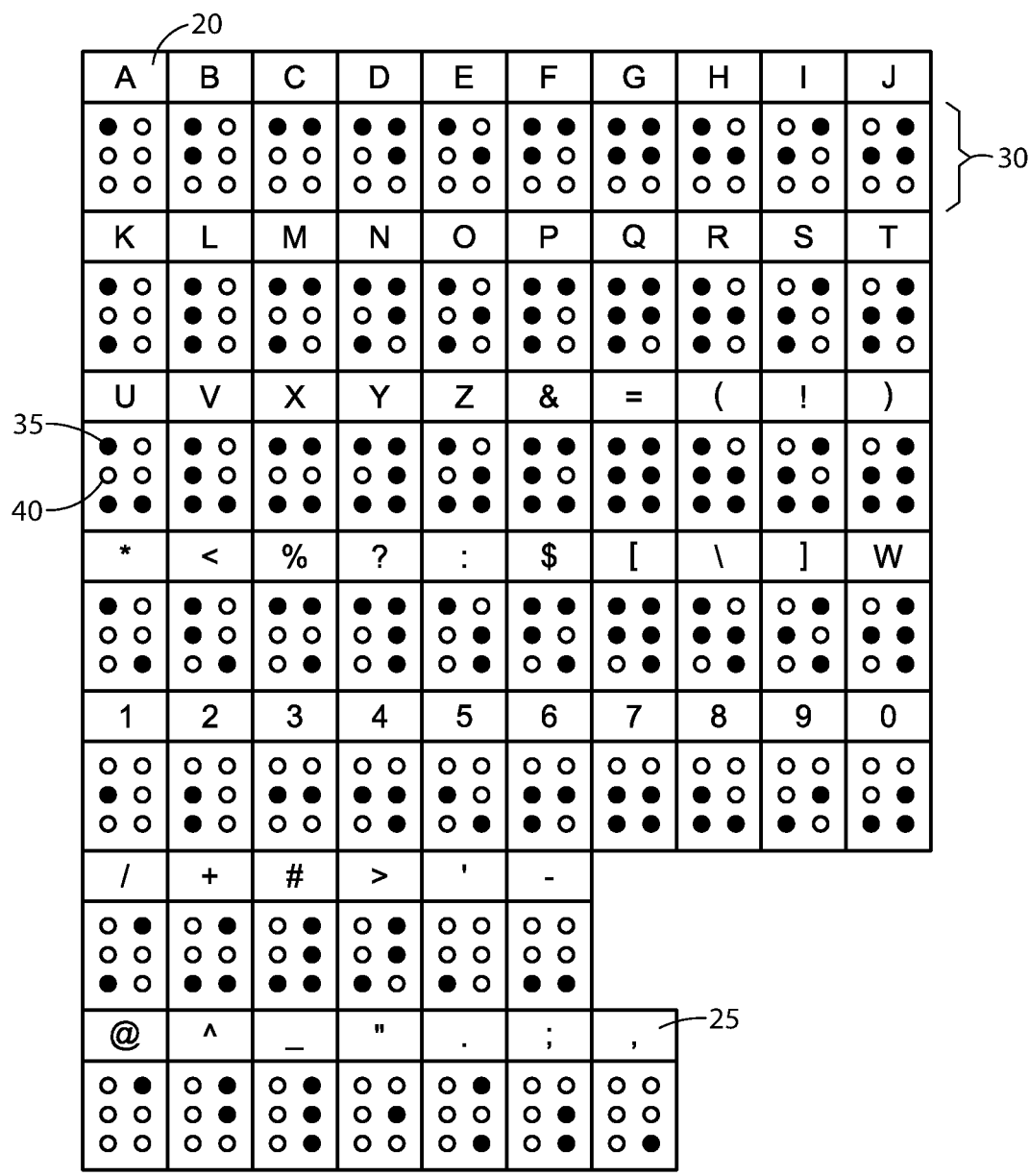
FIG. 1 is a tabular depiction of a Braille English alphabet 15 used with a gesture-based Braille-to-text conversion Braille communication system 10 that is in accord with the preferred embodiment of the present invention.

10 Braille communication system
15 Braille English alphabet
20 alphanumeric character
25 punctuation symbol
30 dot array
35 raised dot
40 non-raised dot
45 touch screen-enabled electronic device
50 touch screen
55 swiping device
60 right swiping motion "R"
65 left swiping motion "L"
75 input area
98 method of producing text
100-126 steps of method 98

DETAILED DESCRIPTION OF THE PREFERRED EMBODIMENT

The preferred embodiment of the present invention is depicted in FIGS. 1 through 3B. However, the invention is not limited to the specifically described embodiment. A person skilled in the art will appreciate that many other embodiments of the invention are possible without deviating from the basic concept of the invention. Any such work around also falls within the scope of this invention.

In the figures like numbers refer to like elements throughout. Additionally, the terms "a" and "an" as used herein do not denote a limitation of quantity, but rather denote the presence of at least one (1) of the referenced items.

Refer now to FIG. 1 for a tabular depiction of a Braille English alphabet 15 used with a Braille communication system 10 according to the preferred embodiment of the present invention. As shown the Braille English alphabet 15 is comprised of a series of alphanumeric characters 20 and punctuation symbols 25. Each alphanumeric character 20 and punctuation symbol 25 is represented by a dot array 30 which corresponds to the widely used Braille alphabet system that is in standard use by the blind and visually impaired.

Each dot array 30 is a six-bit character set arranged in two (2) columns and three (3) rows. Each of the six-bit positions in the dot array 30 is represented by either a raised dot 35 or by a non-raised dot 40. As the Braille communication system 10 uses a simplified character set based on the traditional Braille writing system a user conversant in traditional Braille will not need to learn any additional characters.

Given that the Braille English alphabet 15 is readily usable by Braille conversant readers the touch-screen based Braille communication system 10 enables Braille users to quickly and easily make calls, send texts and emails, take pictures and in general to share communication content with others and to interact with computer systems.

Figure 2A:
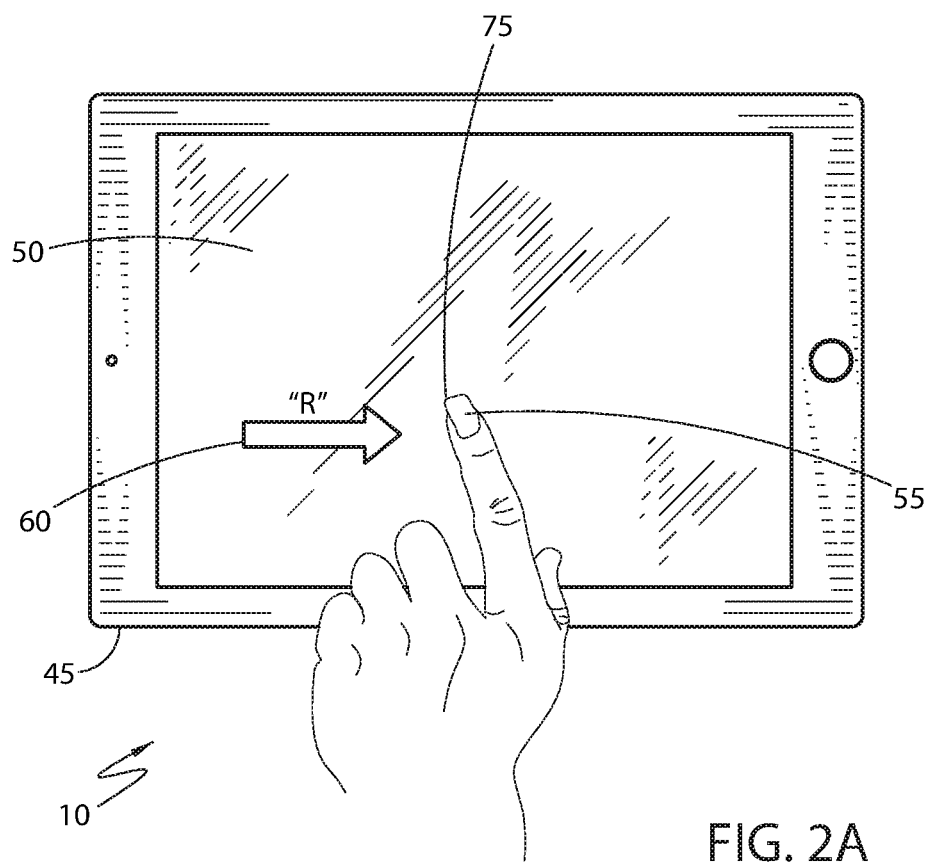
FIG. 2a is a figurative depiction of the motion used to produce a raised dot on a specific element using a touch screen-enabled electronic device 45 which uses the inventive Braille communication system 10.

Refer now to FIG. 2A for a figurative depiction of the motion required to produce a raised dot 35 of a specific element of a touch screen-enabled electronic device 45 that uses the Braille communication system 10. While the touch screen-enabled electronic device 45 is depicted as a tablet computer that is for illustrative purposes only. The touch screen-enabled electronic device 45 could be part of a cellular phone, a smart phone, a touch screen-enabled laptop computer, a touch screen-enabled desktop computer, an ATM machine, a smart television, an e-book reader, a vending machine, an information kiosk such as found in shopping mall, a city map, a tour guide, a health care device or monitor, an automobile telematic device, a wearable device such as a smart watch, a fitness band, or the like. As such, the inclusion or exclusion of any particular type of touch screen-enabled electronic device 45 is not intended to be a limiting factor of the present invention.

Still referring to FIG. 2A, the touch screen-enabled electronic device 45 may be based on any of a wide number of technologies which can provide a touch screen 50, including a cathode ray tube (CRT), a liquid crystal display (LCD), a light-emitting diode (LED) display, an organic light-emitting diode (OLED) display, a Super AMOLED display and a flexible touch screen such as a bendable OLED display.

To produce a raised dot 35 a user uses a swiping device 55 such as their finger (as shown in FIG. 2a) or a stylus to produce a right swiping motion "R" 60 on the touch screen 50. Such action is read into the touch screen-enabled electronic device 45 that operates the touch screen 50 and the touch screen-enabled electronic device 45 then interprets that motion as a raised dot 35 (as shown in FIG. 1). Of course that interpretation is software based using a non-volatile software program. Further explanation of the overall method used to generate an entire element of the Braille English alphabet 15 as well as for producing multiple elements and error checking is provided below.

Figure 2B:
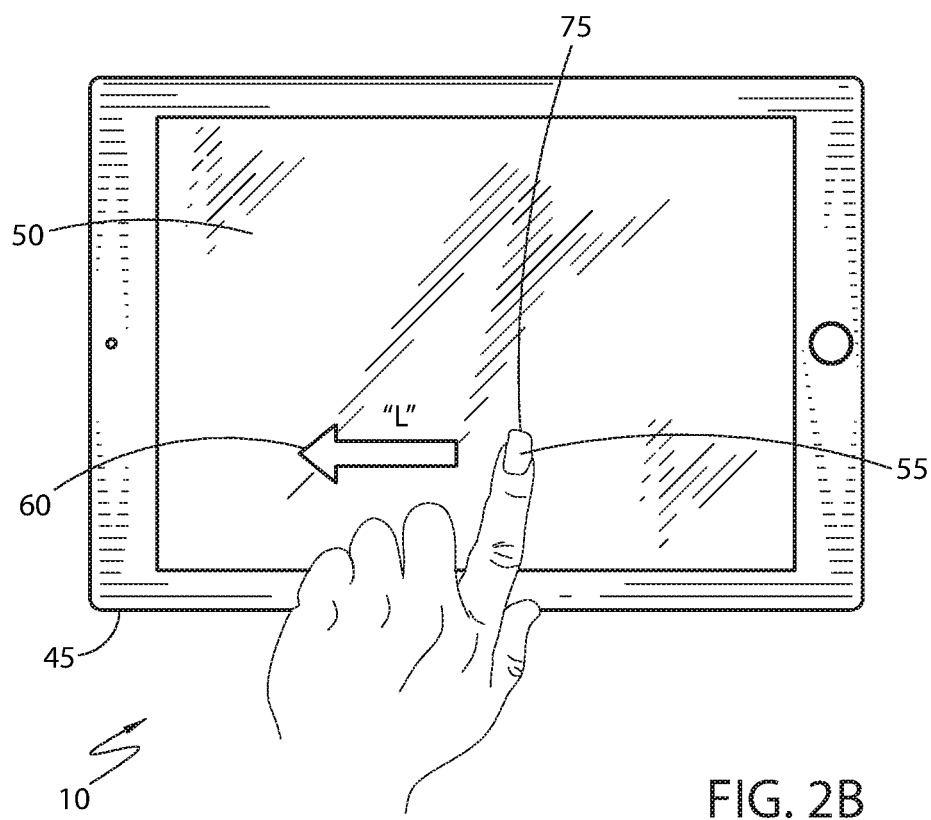

Refer now to FIG. 2B for a figurative depiction of the motion required to produce a non-raised dot 40 on a specific element on a touch screen-enabled electronic device 45. As described above with reference to FIG. 2A, the touch screen-enabled electronic device 45, the touch screen 50, and the swiping device 55 are utilized in a similar manner. However, to produce a non-raised dot 40 (as shown in FIG. 1) the swiping device 55 is used in a left swiping motion "L" 65 on the touch screen 50. Such action is read into the touch screen-enabled electronic device 45 that operates the touch screen 50 and the touch screen-enabled electronic device 45 interprets that motion as a non-raised dot 40 (as shown in FIG. 1). Further explanation of the overall method used to generate an entire element of the Braille English alphabet 15 as well as for producing multiple elements and error checking is provided below.

It should be understood that creating a raised dot by swiping right is just one possible implementation. A left swipe could be used to create a raised dot and then a right swipe would be used to create a non-raised dot. Alternatively, swiping up and down are also possible. In fact, one (1) beneficial way to implement the gesture-based Braille text system is to allow the user to specify which swipe direction should be used to input a raised dot and which direction should be used to produce a non-raised dot.

Figure 3A:
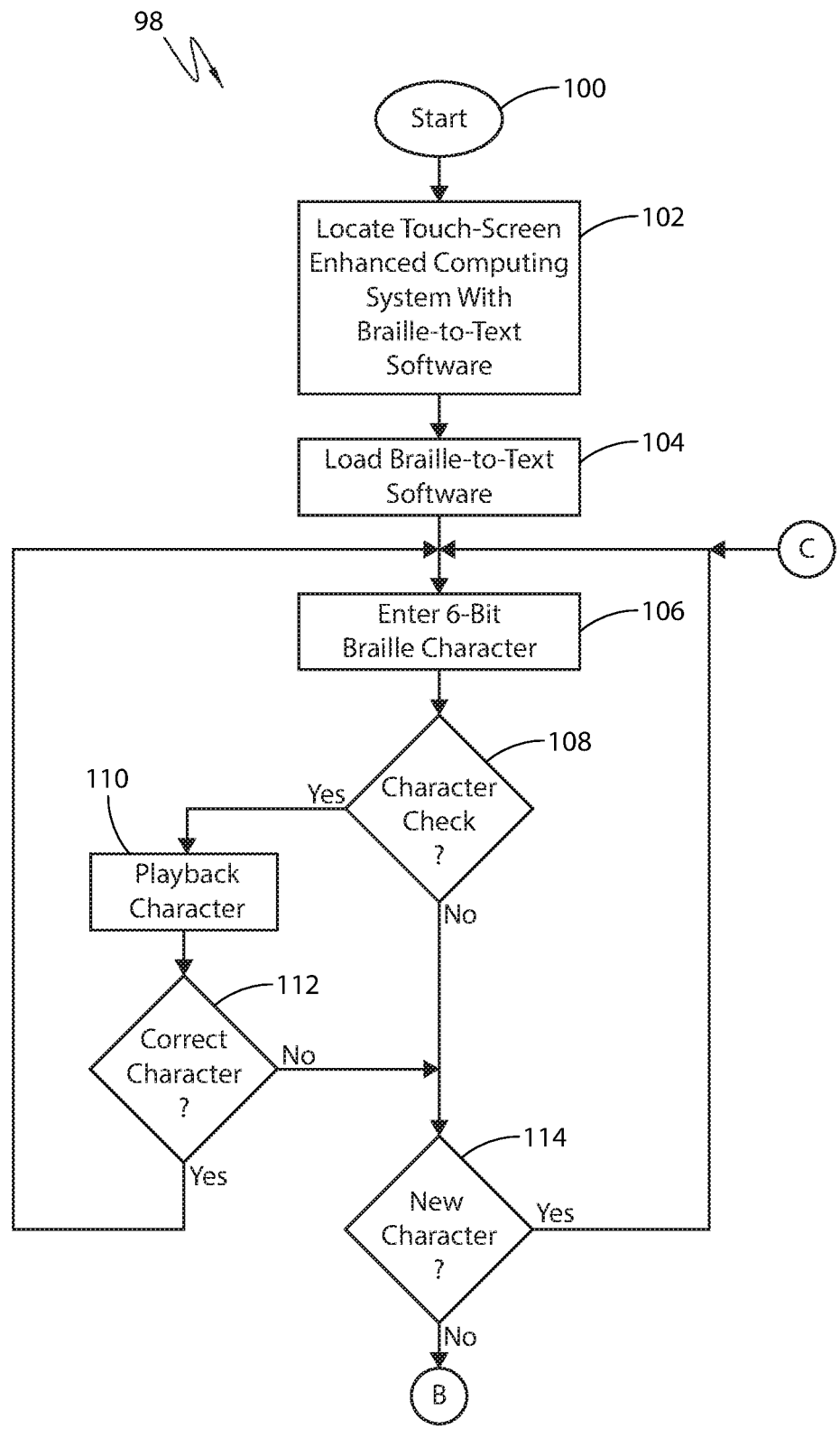
FIG. 3A is a flow chart depiction of part of a method 98 of producing text using the Braille enable communication system 10; and, FIG. 3B is a flow chart depiction of the remainder of the method 98 of producing text using the Braille communication system 10.
Figure 3B:
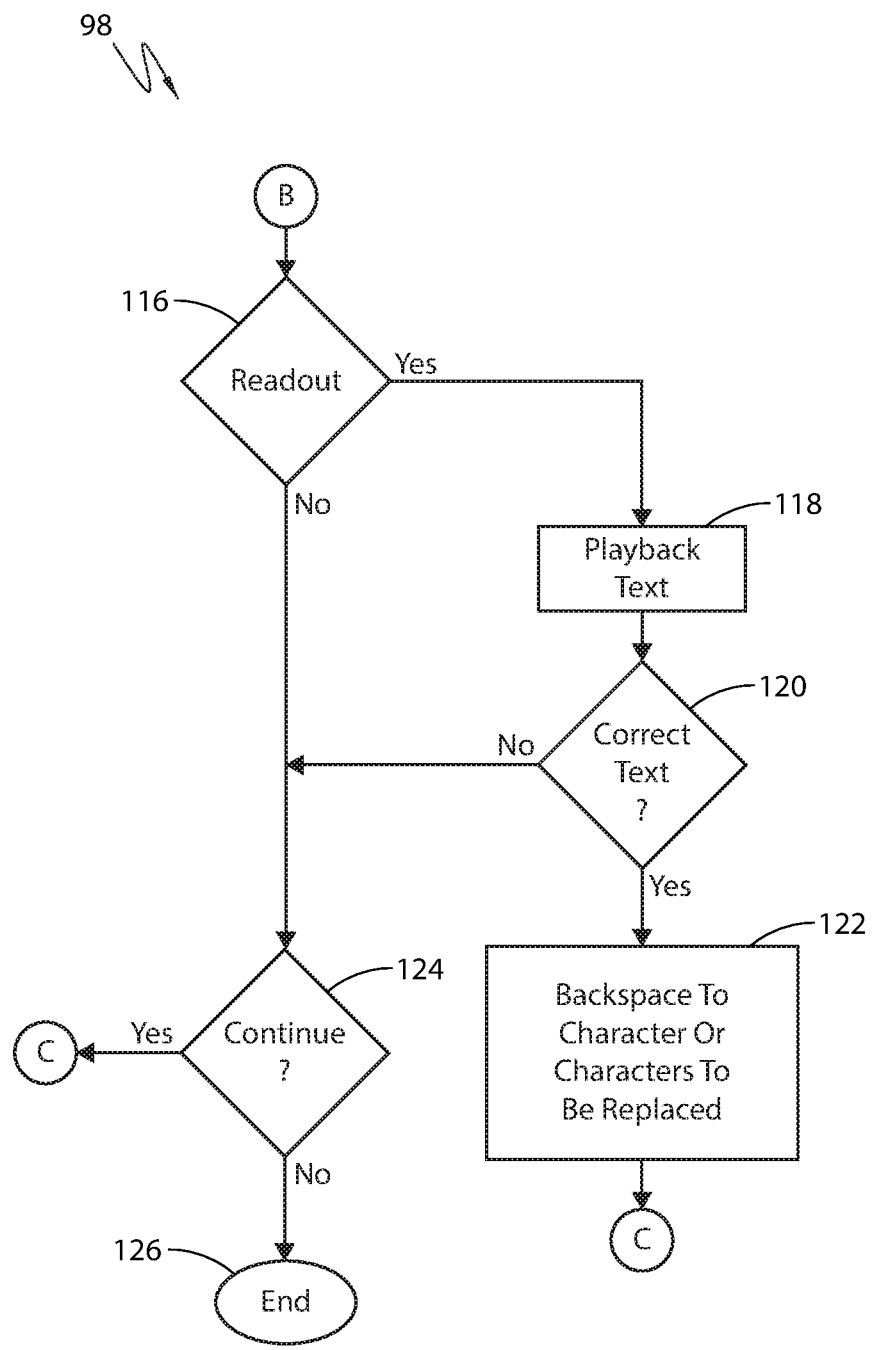

Refer now to FIG. 3A for a flow chart depicting part of a method 98 that is used to produce (generate) a specific character of the Braille English alphabet 15, multiple characters to form text entries, along with multiple error checking routines. As any type of human input is prone to error, it is easily understood that input made without visual feedback would be subject to frequent errors. As such the Braille communication system 10 provides the user with an enhanced verification process as well as the opportunity to correct any discovered errors.

The method 98 begins at start step 100. At step 100 a user decides to use the Braille communication system 10. This enables one to not use the Braille communication system 10 and thus to use "normal" data entry. The next step 102 is to locate a touch screen-enabled electronic device 45 with Braille text software. The following step 104 is to load (run) the Braille text software to cause the touch screen-enabled electronic device 45 to begin interpreting touch screen gestures applied to the touch screen 50 as Braille text input.

The user then begins to enter a six-bit Braille character from the Braille English alphabet 15 at step 106. Each dot of the Braille English alphabet 15 three-by-two matrix (3×2) is entered individually. This requires the user to make six (6) swipes. At the completion of entering the six-bit Braille character the user is given an option at step 108 to make a character check. The user may be prompted by an audio signal such as a beep, a vibration signal or some other signaling notification that a six-bit character has been read in and that a character check can be made. Alternatively, upon completion of entering a six-bit Braille character the method 98 might automatically playback the entered character.

If in step 108 a character check is to be made, the method 98 proceeds to step 110 for a playback of the just-entered character. The user is then given an opportunity at step 112 to correct that character. If the user signals a desire to correct that character step 112 proceeds back to step 106 for re-entry of the just entered six-bit Braille character.

Still referring to step 112, as noted the method 98 provides the user with the ability to correct entered text. In the method 98 errors may be found in a number of different text units such as individual characters, words, sentences, paragraphs or even entire documents. At step 112 the user can correct at the character level. One (1) method of signaling that a correction is required is to have the method 98 recognize a gesture set such as "abc" that would signal the need for a correction. This is acceptable as "abc" is seldom used in words. In case a gesture set such as "abc" is used to signal a correction another gesture set such as "xyz" could signal that no correction is needed. Other methods of signaling that a correction is needed can include double tapping the touch screen, by using a verbal command, or by swiping up or down. The same general method of signaling that a correction is or is not needed is also used at the word, sentence, paragraph and document levels as described subsequently.

However, if at step 112 the user does not wish to correct the just-entered character, or following step 108 when a character check is declined, the method 98 proceeds to step 114 for a determination of whether a new character is to be entered. Step 114 enables a user to not only enter a single character but to enter multiple characters as required for entering a word, a sentence, a paragraph, or a complete document. However, if the Braille communication system 10 is being used to enter a command into the touch screen-enabled electronic device 45 only one (1) Braille character may be required.

If multiple characters are to be entered the method 98 loops back to step 106 from step 114 for entry of another six-bit Braille character from the Braille English alphabet 15. This process of entering six-bit Braille characters, character checking, and deciding whether to enter another character continues to loop through steps 114 and step 106 until the user determines that a new character is not to be entered.

When the user determines at step 114 that a new character need not be entered, the method 98 proceeds to step 116 where the user is given an opportunity to read out aloud (audio playback) his input. If it is to be read out, step 116 proceeds to step 118 where the text is read out aloud. Following step 118 the user at step 120 is given an opportunity to correct the text. If at step 120 the user determines that the text should be corrected, at step 122 the user is given an opportunity to backspace to the character upon which the error was found. Step 122 backspacing can be based on oral input, tapping the touchscreen, an audible input or some other method by which the touch screen-enabled device 45 can identify where character corrections should start. Then the method 98 proceeds from step 122 back to step 106 where the user can begin entering another six-bit Braille character that overrides the character identified in step 122.

However, if at step 116 the user decides that a readout should not be taken, the method 98 proceeds to step 124 where a decision is made whether to continue entering text. If additional text is to be entered, the method returns to step 106 for entry of another six-bit Braille character input. However, if the user signals that no additional Braille text entry is to be performed the method 98 ends at step 126.

The Braille communication system 10 as described herein could be utilized on any software system including but not limited to Google Android, Apple iOS, VXWorks, Samsung Tizen, Samsung Bada, Microsoft Windows Phones OS, Microsoft Surface, Oracle J2ME, Linux-based embedded systems, Palm OS, RIM Blackberry, Ubuntu Mobile, Nokia Symbian, Firefox Mobile OS, or other well-known operating systems and operating systems under development.

Referring to FIGS. 2A and 2B, in the method 98 the user swipes in an input area 75 of the touch screen 50. The input area 75 may be the entire area covered of the touch screen 50. However, in some embodiments the input area 75 of the touch screen 50 may take up only part of the touch screen 50. That will enable another part of the touch screen 50 to be used to enter correction directions.

As an example of the actions required to produce a character consider the letter "A." To create that character the user would perform one (1) right swiping motion "R" 60 to produce one (1) raised dot immediately followed by five (5) left swiping motions "L" 65 for 5 non-raised-dots.

The three-by-two (3×2) matrix is preferably entered row-wise. That is the first two (2) gestures enter the top row from left to right, the next two (2) gestures enter the middle row from left to right, and the last two (2) gestures enter the bottom row from left to right. However, in practice it would be beneficial to enable a user to change the entry scheme.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. It is envisioned that the Braille communication system 10 would be implemented in general accordance with FIG. 1 through FIG. 3B.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A Braille communication system, comprising:
a touch screen-enabled electronic device having a super AMOLED display touch screen and a touch screen enabled interface, said touch screen-enable interface inputs a six-bit Braille character composed of a plurality of raised dots and a plurality of non-raised dots, wherein said raised dots are created by a swipe in a first direction, said non-raised dots are created by a swipe in a second direction and said first direction is to a right direction and said second direction is to a left direction; and
a dot array corresponding to the six-bit Braille character that is used by a blind and visually impaired persons, said dot array is represented by an alphanumeric character and a punctuation symbol;
wherein swiping in the first direction and in the second direction is done on an input area of said touch screen.

2. A communication system in combination with a super AMOLED display touch screen enabled interface, comprising:
a stored non-transitory storage media for conversion between a plurality of Braille text and another written language based upon receipt of input, said Braille text includes at least one Braille character;
wherein said input includes a first gesture corresponding to a first element of said at least one Braille character which is read by said interface;
wherein said input further includes a second gesture corresponding to a second element of said at least one Braille character which is read by said interface;
wherein said first gesture and said second gesture input said at least one Braille character, said first gesture is a swipe is a right direction and said second gesture is a swipe in a left direction, said first gesture corresponds to a raised dot of said at least one Braille character and said second gesture corresponds to a non-raised dot of said at least one Braille character, a third gesture that activates an audible validation step, said third gesture is a double tap;
wherein said computing system converts said at least one Braille character into said another written language; and
wherein said another written language is English.

* * * * *